United States Patent [19]

DelGrosso et al.

[11] Patent Number: 5,512,081
[45] Date of Patent: Apr. 30, 1996

[54] HYBRID BRAZE ALLOY

[75] Inventors: Eugene J. DelGrosso, Wallingford, Conn.; Michael R. Coles, Corpus Christi, Tex.

[73] Assignee: United Technologies Corporation, Hartford, Conn.

[21] Appl. No.: 390,013

[22] Filed: Feb. 17, 1995

[51] Int. Cl.⁶ .................................................... C22C 21/12
[52] U.S. Cl. .................................................... 75/255
[58] Field of Search .................................................... 75/255

[56] References Cited

U.S. PATENT DOCUMENTS

| | | | |
|---|---|---|---|
| 2,725,287 | 11/1955 | Cronin | 75/255 |
| 3,108,369 | 10/1963 | Koeplinger | 29/488 |
| 3,155,491 | 11/1964 | Hoppin | 75/255 |
| 3,259,973 | 7/1966 | Quass et al. | 29/504 |
| 3,321,828 | 5/1967 | Miller | 29/488 |
| 3,333,482 | 3/1968 | Miller | 29/501 |
| 3,373,483 | 3/1968 | Miller | 29/501 |
| 3,415,697 | 12/1968 | Bredy | 75/255 |
| 3,673,678 | 7/1972 | Moreau et al. | 29/494 |
| 3,973,718 | 8/1976 | Deschamps | 228/183 |
| 4,040,822 | 8/1977 | Stern | 75/140 |

FOREIGN PATENT DOCUMENTS 57-88967  6/1982  Japan.

OTHER PUBLICATIONS

W. Schultz & H. Schoer, "Fluxless Brazing of Aluminum" Oct. 1973 edition of Welding Journal.

*Primary Examiner*—Sam Silverberg
*Attorney, Agent, or Firm*—Malcolm J. Chisholm, Jr.

[57] ABSTRACT

A hybrid braze alloy is disclosed that includes an aluminum alloy and a magnesium alloy mixed together. In use of the hybrid braze alloy, the ratio by weight of aluminum alloy to magnesium alloy making up the mixture may be altered within a working braze ratio range of about forty nine to one (49/1) to about four point eight to one (4.8/1), so that the braze melting temperature of the hybrid braze alloy is a function of the ratio. By altering the ratio of the alloys within the working braze ratio range, a braze melting temperature may be achieved that is most appropriate for brazing a specific component to a specific apparatus.

8 Claims, No Drawings

HYBRID BRAZE ALLOY

TECHNICAL FIELD

The present invention relates to braze alloys and especially relates to low temperature braze alloys for brazing components to previously brazed articles, such as a plate and fin heat exchanger core.

BACKGROUND OF THE INVENTION

As is well known in the art, a core of a plate and fin heat exchanger is typically fabricated of light-weight, braze clad aluminum-based metal sheets formed into layers that direct fluids in a heat exchange relationship. The formed layers are most often assembled into a stack and temporarily secured in fixed positions by a brazing fixture. The fixture is then placed within a vacuum furnace that creates a non-oxidizing atmosphere, and the temperature within the furnace is raised to melt braze alloys in the braze cladding, thereby permanently securing the layers into a core stack. It is critical that the temperature within the furnace be kept below the melting temperature of the aluminum-based metals making up the sheets.

After removal from the furnace, a variety of components may be secured to the stack such as fluid directing headers or manifolds, bosses for securing the stack to test apparatus, alignment flanges, etc., to complete fabrication of the core. Such components are secured to the stack through different methods including mechanical fastening, welding, and/or subsequent or secondary brazing. The core is then affixed to a variety of fluid directing conduits and related apparatus to allow it to operate in exchanging heat between a working fluid and a heat exchange fluid.

Modern heat exchangers, such as those used in commercial aircraft, and/or near zero-gravity environments, must operate under precise high pressure load tolerances, while meeting strict weight limitation requirements. Therefore, the quality of the bonds created by the braze alloys in the braze cladding must be very consistent. Accordingly, when heating the brazed stack for securing the components through further brazing, it is imperative that the temperature at any point in the stack not exceed the melting temperature of the previously melted braze alloys to avoid damage to the stack through localized weakening, etc. of the previously brazed layers.

Consequently, many efforts have been made to create low temperature braze alloys, such as those described in U.S. Pat. No. 4,040,822 to Stern, which Patent is incorporated herein by reference. Most such low temperature braze alloys are specifically directed to brazing non-ferrous metals such as aluminum, and the braze alloys typically include at least 0.1% to 5% magnesium, 0.1% to 5% rare earth elements, 4% to 15% silicon, with the balance being aluminum.

While those efforts have produced satisfactory low temperature braze alloys for limited working environments, the resulting braze alloys are restricted to a specific melting temperature, and therefore are appropriate only to brazing a specific base metal. Modern heat exchangers, however are increasingly designed for very demanding work environments and must exhibit ever decreasing total weight parameters. Consequently, new non-ferrous metal alloys are being used in thinner sheets, while the components added on after the first braze operation are likewise being fabricated of lightweight, low melting temperature metals. Additionally, such heat exchangers are susceptible of thermal fatigue stress upon repeated exposure to high temperature braze procedures. Finally, the increasing cost of replacing modern heat exchangers mandates a substantial effort at repair of core leaks, through further brazing treatments. While a low temperature braze alloy may be selected from the prior art that achieves a satisfactory braze for the variety of aforesaid braze requirements, a substantial number of braze alloys must be accessible, or stored and used to efficiently satisfy those requirements.

Accordingly, it is a general object of the present invention to provide an improved braze alloy that overcomes the deficiencies of the prior art braze alloys.

It is a more specific object to provide an improved braze alloy that affords a range of braze temperatures.

It is another particular object to provide an improved braze alloy that affords customizing the alloy to a specific melting temperature, to best satisfy unforeseen braze temperature demands.

It is yet another object to provide an improved braze alloy that minimizes cost and storage problems of prior art braze alloys.

These and other advantages of this invention will become more readily apparent by reviewing the following description.

DISCLOSURE OF THE INVENTION

A hybrid braze alloy is disclosed for brazing metals, and in particular for brazing components to a previously brazed apparatus. The hybrid braze alloy comprises two alloys mixed together to form a mixture. In a preferred embodiment, the hybrid braze alloy comprises an aluminum alloy and a magnesium alloy, wherein each alloy is in a powdered metal form mixed together with an appropriate solvent, or mixed together in a resin binder with the solvent.

In use of the hybrid braze alloy, the ratio by weight of aluminum alloy to magnesium alloy making up the mixture may be altered within a working braze ratio range of about forty nine to one (49/1) to about four point eight to one (4.8/1), so that the braze melting temperature of the hybrid braze alloy is a function of the ratio. By altering the ratio of the alloys within the working braze ratio range, a braze melting temperature may be achieved that is most appropriate for brazing a specific component to a specific apparatus. In particular, increasing the relative proportion of the magnesium alloy within the mixture lowers the braze melting temperature of the hybrid braze alloy.

BEST MODE FOR CARRYING OUT THE INVENTION

The hybrid braze alloy of the present invention comprises a mixture of an aluminum alloy and a magnesium alloy. In a preferred embodiment the alloys are in a powdered metal form wherein the particle size of the alloys ranges from 50 to 200 microns, preferably about 100 microns. The aluminum alloy appropriate for the hybrid braze alloy consists essentially of the following elements by weight:

| | | | |
|---|---|---|---|
| 9.3% | to | 13% | Silicon |
| 0.3% | to | 4.7% | Copper |
| 0.0% | to | 0.8% | Iron |
| 0.2% | to | 10.5% | Zinc |
| 0.1% | to | 1.5% | Magnesium, and |
| | The Balance | | Aluminum. |

The magnesium alloy appropriate for the hybrid braze alloy consists essentially of the following elements by weight:

| | | | |
|---|---|---|---|
| 5.3% | to | 9.7% | Aluminum |
| 0.35% | to | 3.5% | Zinc |
| 0.13% | to | 0.35% | Manganese |
| 0.3% | to | 0.5% | Silicon |
| 0.0% | to | 0.1% | Copper |
| 0.01% | to | 0.03% | Nickel, and |
| | The Balance | | Magnesium. |

A substantial variety of standard aluminum-based alloys are known within the above specific ranges of constituent elements of the aluminum alloy of the hybrid braze alloy. For example, aluminum-based alloys commonly referred to as "716" or "AA4145"; and "718", or "AA4047", are made of elements within the above stated ranges of the aluminum alloy of the hybrid braze alloy. The 716 or 718 aluminum-based alloys are readily available from a variety of metal suppliers in powder form, such as ALCOA's AA4145 or AA4145 powdered metal alloy, as manufactured and sold by the Aluminum Company of America, of Pittsburgh, Pa.

Similarly, a variety of standard magnesium-based alloys are available within the above specific ranges of the constituent elements of the magnesium alloy of the hybrid braze alloy. For example, magnesium-based alloys commonly referred to as "AZ91", or "AMS 4490"; "AZ81", or "ASTM B80-69"; and "AZ63", or "AMS 4420" are made of elements within the above stated ranges of the magnesium alloy of the hybrid braze alloy. The AZ91, AZ81 and AZ63 are readily available in powder form under those trade names from a variety of metal suppliers, such as the International Nickel Company of New York, N.Y.

The aluminum and magnesium alloys of the hybrid braze alloy are mixed in a resin binder means for binding the alloys together, such as epoxy or acrylic resins well known in the brazing art, with an appropriate solvent means, such as alcohol, acetone, lacquer thinners, or mineral spirits, again as is well known in the brazing art, for holding the mixture together and adhering the mixture to a surface to be brazed. Examples of a acceptable resin binder means and solvent means are any of the many materials well known in the brazing art that are vaporized or sublimed below 600 degrees fahrenheit in a typical non-oxidizing, vacuum brazing atmosphere.

The solvent means may be mixed alone with powdered aluminum and magnesium alloys, or the resin binder means and solvent means may be mixed together with the powdered aluminum and magnesium alloys. In either case, the solvent means and/or resin binder means are mixed in an appropriate proportion to make a paste to place on portions of materials to be brazed together. A typical proportion of a suitable binder would be one unit by weight of the binder for each three to five units of total alloy weight to make a workable hybrid braze alloy paste. Similarly, a typical proportion of a suitable solvent would be one unit by weight of the solvent for each three to twenty units of total alloy weight to make a workable hybrid braze alloy paste, depending upon the degree of spreadability required for a specific brazing operation.

As can be seen from the listings of constituent elements of the aluminum alloy and magnesium alloy, the amount by weight of aluminum in the aluminum alloy may vary between approximately 70% to approximately 90%, while the amount by weight of magnesium in the magnesium alloy may vary between approximately 86% and 94%. When the ratios of aluminum and magnesium alloys are mixed within a working braze ratio range varying from forty nine parts of aluminum alloy by weight to one part of magnesium alloy by weight (49/1) to four point eight parts of aluminum alloy by weight to one part of magnesium alloy by weight (4.8/1), the proportion of magnesium in the resulting hybrid braze alloy will vary within that range of ratios from approximately 2.0% (at the 49/1 ratio) to approximately 28% (at the 4.8/1 ratio).

Use of the hybrid braze alloy of the present invention demonstrates that increasing the relative proportion of magnesium in the hybrid braze alloy decreases a braze melting temperature of the hybrid braze alloy. Based on observations of its use, a working example of the hybrid braze alloy would be prepared such that the aluminum alloy consisted of a standard 716 aluminum-based alloy that comprised between 9.3% to 10.7% silicon, 3.3% to 4.7% copper, about 0.8% iron, about 0.2% zinc, and about 0.15% magnesium with the balance being aluminum. The magnesium alloy in the working example would be made of a standard AZ91 magnesium-based alloy that comprised between 8.3% to 9.7% aluminum, 0.35% to 1.0% zinc, about 0.13% manganese, about 0.5% silicon, about 0.1% copper and about 0.03% nickel with the balance being magnesium. The aluminum and magnesium alloys are powdered to approximately 100 microns, and mixed in a ratio of fourteen parts of aluminum alloy by weight to one part of magnesium alloy by weight (14/1) in a resin binder with an alcohol solvent to produce an exemplary hybrid braze alloy.

The exemplary hybrid braze alloy is placed on surfaces to be brazed together, and the surfaces are heated in a non-oxidizing, vacuum atmosphere. As the heat increased beyond approximately 750 degrees fahrenheit (all temperature references herein are in degrees fahrenheit), some of the magnesium vaporizes to achieve gettering and cleansing of the surfaces, as is well known in the art. At approximately 880 degrees, the magnesium alloy starts melting and the molten magnesium reacts with the aluminum of the aluminum alloy to lower the melting temperature of the aluminum alloy at its reactive interface to 920–950 (±/5) degrees. At approximately 950 degrees, the hybrid braze alloy achieves a braze melting temperature, wherein the hybrid braze alloy becomes sufficiently molten to form a strong braze joint.

It has been found that the hybrid braze alloy of the present invention will achieve an ever decreasing braze melting temperature as the ratio of aluminum alloy by weight to magnesium alloy is adjusted through the working braze ratio range of forty nine to one (49/1) aluminum alloy to magnesium alloy, to four point eight to one (4.8/1) aluminum alloy to magnesium alloy. At the lowest magnesium alloy content ratio in the working braze ratio range of forty nine to one (49/1), the braze melting temperature is approximately 965 (±5) degrees. At the highest magnesium alloy content ratio in the working braze ratio range of four point eight to one (4.8/1), the braze melting temperature is approximately 900 (±5) degrees.

Many apparatus require a series of brazes. For example, heat exchanger cores typically comprise a core stack consisting of a series of non-ferrous metal layers aligned in a cooperative relationship to direct a heat exchange fluid in a heat exchange relationship with a working fluid, as is well known in the art. Typically the layers comprise fluid directing sheets made of non-ferrous metal alloys, and the sheets include a braze cladding well known in the art. The braze metal in the braze cladding is often an aluminum-based metal, such as the 716 aluminum-based alloy referred to above. The sheets are aligned in a brazing fixture to be brazed together in a non-oxidizing atmosphere to form a core stack. Subsequent to that primary braze procedure, additional or secondary brazing is often required to secure components to the core stack. To maintain consistency of the prior brazing of the layers as is known in the art, it is critical that the additional brazing procedures do not approach the melting temperatures of the braze metals in the braze cladding of the aluminum-based sheets. The hybrid braze alloy of the present invention affords flexibility in achieving a desired melting temperature for such secondary brazing procedures.

As an example, if the braze cladding includes the 716 aluminum-based alloy as its braze metal, the standard melting temperature of the 716 aluminum-based alloy is approximately 980 degrees fahrenheit. Use of the above-referenced exemplary hybrid braze alloy having a ratio of fourteen parts of aluminum alloy to one part of magnesium alloy by weight (14/1) would afford a braze melting temperature of 920–950 (±5) degrees, well below the 980 degree melting temperature of the 716 aluminum-based metal used as a braze metal in the original braze. In the event a subsequent leak near the sight of the secondary braze had to be repaired, or additional tertiary brazes of any nature had to be made, a formulation of the hybrid braze alloy having a lower braze melting temperature could be prepared by simply increasing the relative amount of magnesium alloy by weight within the working braze ratio range of the hybrid braze alloy.

Consequently, it can be seen that by the simple expedient of storing the aluminum and magnesium alloys one can customize the hybrid braze alloy to achieve a specific target braze melting temperature by adjusting the ratio of aluminum alloy by weight to magnesium alloy by weight through the working braze ratio range. While the present invention has been described with respect to the aforesaid embodiments and examples, it is to be understood by those skilled in the art that the hybrid braze alloy is not limited thereby. For example, provided the aluminum and magnesium alloys remain as separate alloys, the hybrid braze alloy includes non-powder based embodiments such as slurrys, sprays, or powders compressed or held in the form of rods or wires, etc. Accordingly, reference should be made primarily to the attached claims rather than the foregoing specification to determine the scope of the invention.

What is claimed is:

1. A hybrid braze alloy for fluxless brazing of metals comprising:

a. an aluminum alloy that consists essentially of, by weight:

| | | | |
|---|---|---|---|
| 9.3% | to | 13% | Silicon |
| 0.3% | to | 4.7% | Copper |
| 0.0% | to | 0.8% | Iron |
| 0.2% | to | 10.5% | Zinc |
| 0.1% | to | 1.5% | Magnesium, and |
| The Balance | | | Aluminum, | b. a magnesium alloy that consists essentially of, by weight:

| | | | |
|---|---|---|---|
| 5.3% | to | 9.7% | Aluminum |
| 0.35% | to | 3.5% | Zinc |
| 0.13% | to | 0.35% | Manganese |
| 0.3% | to | 0.5% | Silicon |
| 0.0% | to | 0.1% | Copper |
| 0.01% | to | 0.03% | Nickel, and |
| The Balance | | | Magnesium, | wherein the aluminum alloy and the magnesium alloy are mixed to form a mixture so that relative proportions of the aluminum alloy by weight and magnesium alloy by weight are within a working braze ratio range that includes from forty nine parts of the aluminum alloy to one part of the magnesium alloy (49/1) to four point eight parts of the aluminum alloy to one part of the magnesium alloy (4.8/1).

2. The hybrid braze alloy of claim 1, wherein the aluminum and magnesium alloys are mixed with a solvent means for holding the mixture together and for adhering the mixture to a surface to be brazed by the hybrid braze alloy.

3. The hybrid braze alloy of claim 2, wherein the aluminum and magnesium alloys are mixed with a resin binder means for binding the alloys together.

4. The hybrid braze alloy of claim 3, wherein the aluminum and magnesium alloys are in powdered form so that the particle sizes of the alloys ranges from about 50 microns to about 200 microns.

5. The hybrid braze alloy of claim 4, wherein the aluminum alloy further comprises between 9.3% to 10.7% silicon, 3.3% to 4.7% copper, about 0.8% iron, about 0.2% zinc, and about 0.15% magnesium with the balance being aluminum, and the magnesium alloy further comprises between 8.3% to 9.7% aluminum, 0.35% to 1.0% zinc, about 0.13% manganese, about 0.5% silicon, about 0.1% copper and about 0.03% nickel with the balance being magnesium.

6. A method of preparing a hybrid braze alloy for fluxless brazing of metals that provides a range of braze melting temperatures comprising the steps of:

a. providing an aluminum alloy consisting essentially of, by weight;

| | | | |
|---|---|---|---|
| 9.3% | to | 13% | Silicon |
| 0.3% | to | 4.7% | Copper |
| 0.0% | to | 0.8% | Iron |
| 0.2% | to | 10.5% | Zinc |
| 0.1% | to | 1.5% | Magnesium, and |
| The Balance | | | Aluminum; | b. providing a magnesium alloy consisting essentially of, by weight;

| | | | |
|---|---|---|---|
| 5.3% | to | 9.7% | Aluminum |
| 0.35% | to | 3.5% | Zinc |
| 0.13% | to | 0.35% | Manganese |
| 0.3% | to | 0.5% | Silicon |
| 0.0% | to | 0.1% | Copper |
| 0.01% | to | 0.03% | Nickel, and |
| The Balance | | | Magnesium; | c. mixing an amount of the magnesium alloy with the aluminum alloy to produce a mixture so that the relative proportions of the aluminum alloy by weight and magnesium alloy by weight are within a working braze ratio range that includes from forty nine parts of the aluminum alloy to one part of the magnesium alloy (49/1) to four point eight parts of the aluminum alloy to one part of the magnesium alloy (4.8/1), wherein the braze melting temperature is a function of the amount of magnesium alloy in the mixture.

7. The method of claim 4, including the further step of powdering the aluminum and magnesium alloys so that the particle sizes of the alloys ranges from about 50 microns to about 200 microns.

8. The method of claim 7, including the further step of adding to the mixture a resin binder means for binding the alloys together and a solvent means for holding the mixture together and for adhering the mixture to a surface to be brazed by the hybrid braze alloy.

\* \* \* \* \*